United States Patent [19]

Dalziel

[11] 4,077,236
[45] Mar. 7, 1978

[54] APPARATUS HAVING INWARDLY BIASED FINGERS HINGEDLY ATTACHED TO A HUB FOR CLAMPING AND DRIVING A FLEXIBLE DISC

[75] Inventor: Warren L. Dalziel, Monte Sereno, Calif.

[73] Assignee: Shugart Associates, Sunnyvale, Calif.

[21] Appl. No.: 665,885

[22] Filed: Mar. 11, 1976

[51] Int. Cl.² ............................................. G11B 25/04
[52] U.S. Cl. ........................................ 64/22; 64/15 B
[58] Field of Search ................. 64/22, 15 B; 274/9 B, 274/6 DK; 360/97, 99; 346/137

[56] References Cited

U.S. PATENT DOCUMENTS

| 3,609,722 | 9/1971 | Zenzeflis | 360/97 |
|---|---|---|---|
| 3,838,460 | 9/1974 | Stewart | 360/99 |
| 3,867,724 | 2/1975 | Bruer et al. | 360/97 |
| 3,898,814 | 8/1975 | Chou et al. | 360/99 |

Primary Examiner—Samuel Scott
Assistant Examiner—R. C. Turner
Attorney, Agent, or Firm—Boone, Schatzel, Hamrick & Knudsen

[57] ABSTRACT

An apparatus for clamping and driving a flexible disc for use with a rotatable spindle having a generally conical portion forming a camming surface, and a general cylindrical portion forming a first disc clamping surface and a disc registration surface, the apparatus comprising a generally annular hub having a plurality of stops and being rotatable about and movable along an axis, a plurality of fingers hingedly connected to the outer periphery of the hub, each of the fingers including a second disc clamping surface and a registration engaging surface, a circular spring for biasing the fingers radially inwardly against the stops such that the second disc clamping surfaces form a ring that contacts the camming surface when the hub is moved into engagement with the spindle, and a lifter for carrying the hub assembly and for moving it along the axis, whereby when the disc is loaded between the spindle and the hub and the lifter moves the hub along the axis such that the ring contacts the spindle, continued axial movement causes the ring to expand corresponding to the increasing diameter of the camming surface and wipe the inner periphery of the disc along the camming surface and the registration surface and onto the first disc clamping surface and whereby the spring causes the second disc clamping surface to clamp the disc to the first disc clamping surface, and also serves to positively register the registration engaging surface with the disc registration surface such that substantially all the driving torque associated with the rotating spindle is coupled to the hub.

12 Claims, 8 Drawing Figures

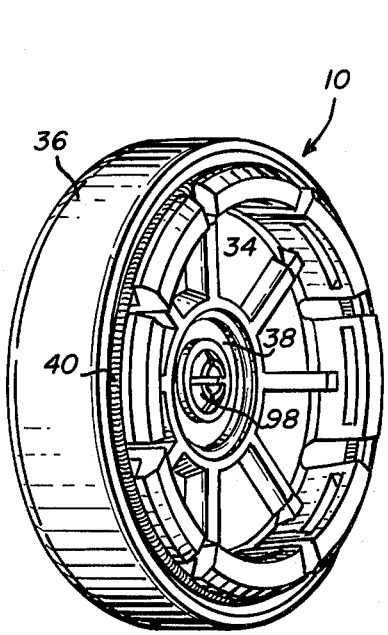
Fig_1
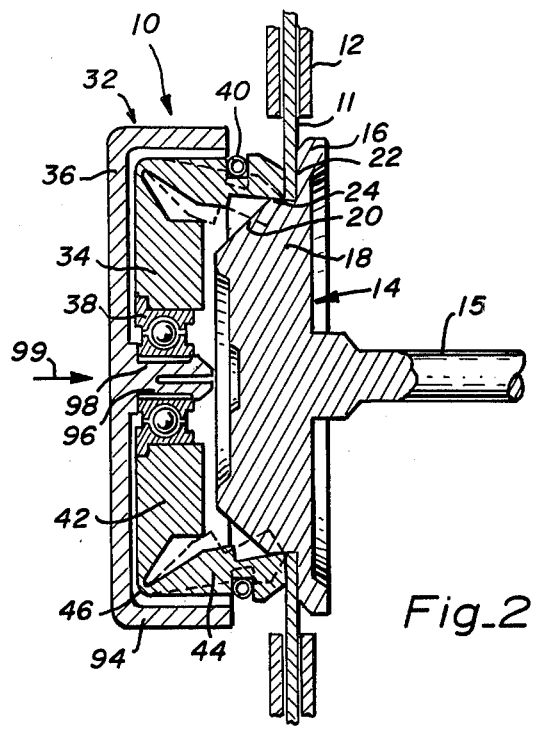
Fig_2
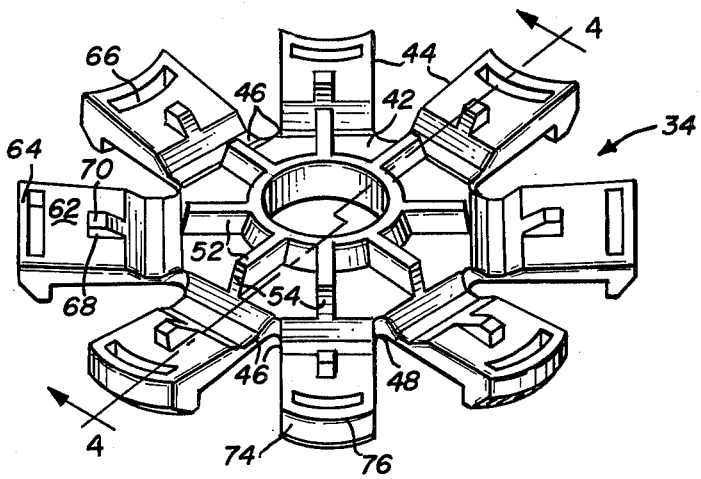
Fig_3
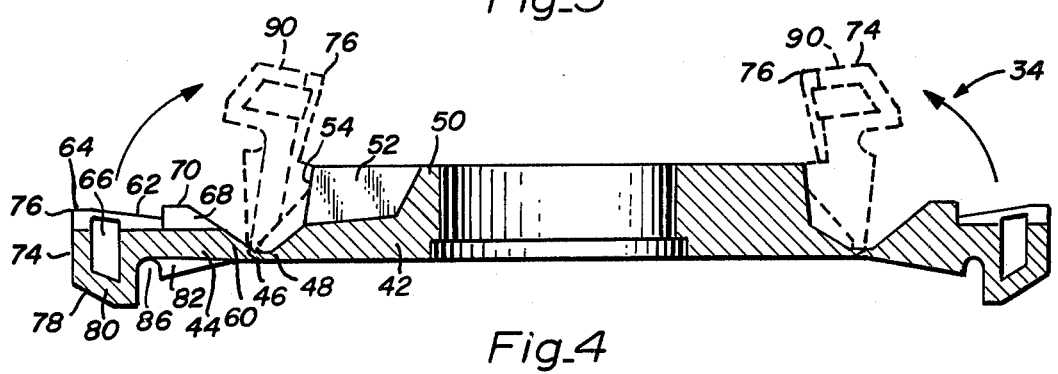
Fig_4

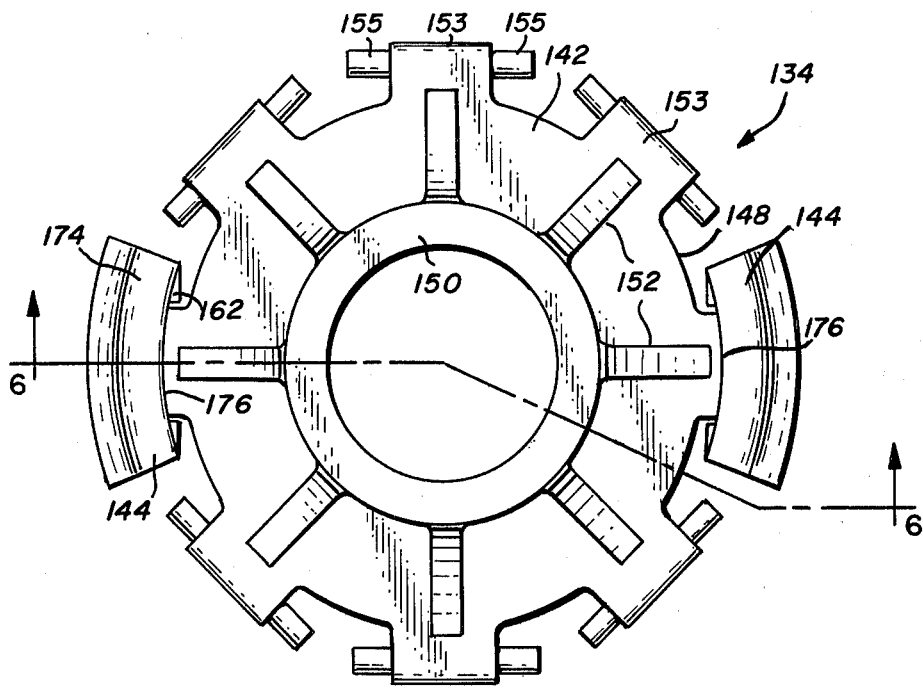
Fig_5
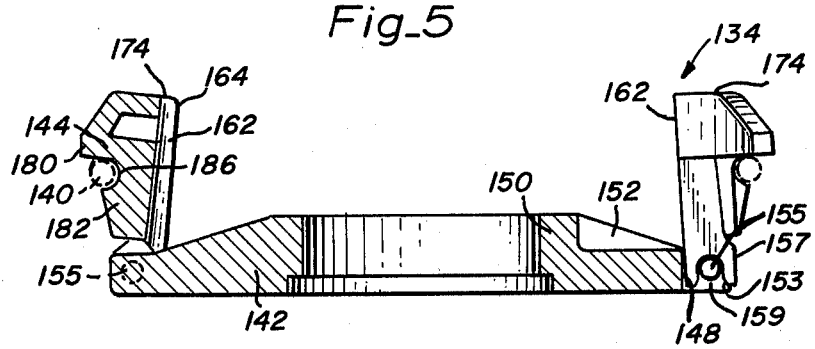
Fig_6
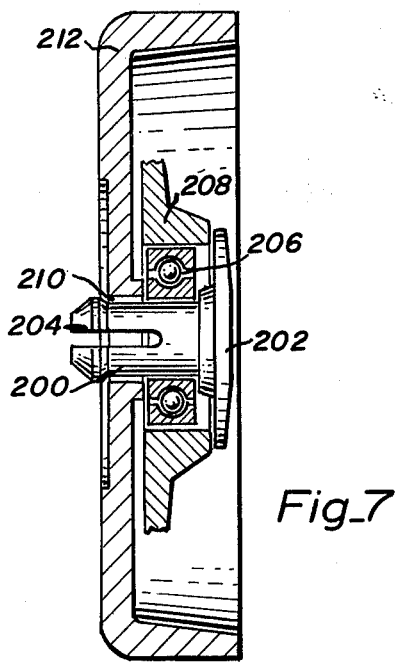
Fig_7
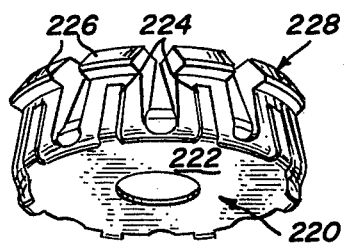
Fig_8

APPARATUS HAVING INWARDLY BIASED FINGERS HINGEDLY ATTACHED TO A HUB FOR CLAMPING AND DRIVING A FLEXIBLE DISC

BACKGROUND OF THE INVENTION

1. Field of the Invention

The present invention relates generally to magnetic recording/playback apparatus and more particularly to an improved flexible disc drive including a hinged hub assembly for clamping and driving a flexible disc.

2. Description of the Prior Art

The flexible disc recording medium, sometimes called a floppy disc or discette cartridge, is a Mylar disc enclosed in a plastic envelope having apertures for enabling the disc to be driven. Magnetic material is secured to the faces of the disc so as to provide the recording surfaces. The cartridge drive unit for receiving and making functional use of the cartridge typically consists of a drive mechanism, a read/write head, and means for receiving and loading the cartridge onto the drive mechanism and the read/write head.

In one type of prior art disc clamping apparatus, a door is opened, the cartridge is inserted into a slot between a drive spindle and a clamping structure, and the clamping structure then clamps the cartridge against the drive spindle. However, insertion of the disc does not provide positive cartridge registration and the disc may be damaged if the door is closed with the cartridge slightly misregistered.

In another prior art device a cartridge guide is utilized to direct the cartridge during insertion toward the spindle. In such devices the door is typically fixed to the cartridge guide by means of cams or linkages so that when the door is closed the cartridge is moved into registration with the drive spindle. However, these devices rarely provide for accurate disc-spindle alignment. Because of the misalignment associated with some prior art devices, registration is obtained only as long as the door is slowly closed such that the disc is gradually moved along the spindle and into registration therewith. However, it has been found that when the door is slammed, typically the disc becomes deformed. Consequently, since the cartridges are somewhat fragile and subject to wear and damage from mistreatment, the useful life of a cartridge is less than it could be if accurate alignment was provided.

In addition, it should be noted that when the disc is loaded, the spindle is normally rotating at its prescribed angular velocity, whereas the disc clamping mechanism is normally stationary and must be driven by the spindle. Accordingly, the disc clamping mechanism must be accelerated in order to reach the angular velocity of the spindle. Furthermore, a certain resistance to rotation is associated with the flexible disc due to its inertia and frictional engagement with the walls of the plastic envelope. Consequently, upon starting, the angular velocity of the disc is different from that of the disc clamping mechanism, and the angular velocity of the spindle is different from that of the disc. Because of these differences in angular velocities, the clamp tends to scuff and sometimes to destroy the magnetic surfaces of the flexible disc in the clamping area.

Still another prior art device employed a rotatable annular hub clamp and a collet having a plurality of spaced apart, flexible pivotable clamping fingers which cam the disc along the spindle into registration with a disc registration surface. A lip of the hub clamp continuously urges the clamping fingers to squeeze radially inwardly against a spindle registration surface. In addition, a ring having disc aligning fingers is sandwiched between the hub clamp and the collet and serves to initially engage the inner periphery of the disc so as to enable the clamping fingers to cam the disc. Because of the pivotal and the temperature requirements, the resilient clamping fingers are subject to fatigue and to decreased clamping effectiveness after extended usage in high temperature environments. Also, since the clamping fingers are widely spaced apart, they are inefficient in transferring driving torque from the rotating spindle to the hub assembly.

Examples of the prior art devices are found in U.S. Pat. No. 3,898,814 issued Aug. 12, 1975, to Albert S. Chou, Yang Hu Tong, Harold C. Medley and Warren L. Dalziel entitled "Mechanism For Clamping And Driving A Flexible Disc"; U.S. Pat. No. 3,678,481 issued July 18, 1972, in the name of Warren L. Dalziel, Jay B. Nilson and Donald L. Wartner entitled "Data Storage Apparatus Employing A Single Magnetic Disk," and U.S. Pat. No. 3,609,722 issued Sept. 28, 1971, in the name of George E. Zenzefilis, entitled "Center Sealing Data Disc Cassette and Processing Machine."

SUMMARY OF THE PRESENT INVENTION

It is therefore a principle object of the present invention to provide a simple and rugged hub assembly for clamping and driving a flexible disc which is not subject to fatigue, which is positively driven by the spindle and which is capable of providing accurate alignment of the disc with the drive spindle.

Another object of the present invention is to provide a hub assembly which firmly supports, while continuously urging, a flexible disc into registration with the drive spindle without deforming the disc, under all dynamic conditions of clamping.

Yet another object of the present invention is to provide a hub assembly which includes but a single element to clamp the disc and to wipe the disc onto the spindle and thus is not subject to interference problems associated with a many-element structure.

Briefly, preferred embodiment of the present invention includes a generally annular hub having a plurality of stops and being rotatable about and movable along an axis, a plurality of fingers hingedly connected to the outer periphery of the hub, each of the fingers including a disc clamping surface and a registration engaging surface, a circular spring for biasing the fingers radially inwardly against the stops such that the disc clamping surfaces form a ring that contacts a conical camming surface of a spindle when the hub is moved into engagement with the spindle, and a lifter for carrying the hub assembly and for moving it along the axis, whereby when a flexible disc is loaded between the spindle and the hub and the lifter moves the hub along the axis such that the ring contacts the spindle, continued axial movement causes the ring to expand corresponding to the increasing diameter of the camming surface and wipe the inner periphery of the disc along the camming surface and a registration surface and onto a disc clamping surface of the spindle and whereby the spring causes the disc to be clamped between disc clamping surfaces and also serves to positively register the registration engaging surface with the disc registration surface such that substantially all the driving torque associated with the rotating spindle is coupled to the hub. In the preferred embodiment the hub and the fingers are integrally formed from nylon material.

In a second embodiment, the hub includes a plurality of posts protruding tangentially from locations on its outer periphery corresponding to the stops and the fingers are formed to snap onto the respective posts, such that hinges are created. In addition, a preformed leaf spring having a segment disposed against each finger serves to continuously urge the fingers inwardly.

Among the advantages of the present invention are that because of the simplicity of the hub assembly, labor costs in its assembly are minimized and it is not subject to fatigue or relaxation when introduced into high temperature environments.

Another advantage of the present invention is that the spring force causes the fingers to firmly grasp the spindle thereby transferring a substantial amount of the driving torque associated with rotating spindle to the hub.

Still another advantage of the present invention is that the disc is automatically brought into registration with the spindle.

Yet another advantage of the present invention is that the fingers of the hub are always closed to the same inner diameter, thus assuring that the inner periphery of the disc is engaged during the clamping operation.

Other objects and advantages of the present invention will be apparent to those skilled in the art after having read the following detailed description of the preferred embodiments which is illustrated in the several figures of the drawing.

IN THE DRAWING

FIG. 1 is a perspective view of the apparatus in accordance with the present invention;

FIG. 2 is a cross-sectional view illustrating the apparatus of FIG. 1 positioned on a spindle;

FIG. 3 is a perspective view illustrating the hub assembly prior to insertion into the lifter;

FIG. 4 is a cross-sectional view taken along the line 4—4 of FIG. 3 with the position of the fingers when the hub assembly is inserted into the lifter shown in dashed lines;

FIG. 5 is a plan view of a second embodiment of the present invention;

FIG. 6 is a cross-sectional view taken along the line 6—6 of FIG. 5 illustrating the hub;

FIG. 7 is a cross-sectional view of a third embodiment of the present invention illustrating a bearing-retaining stud inserted into the lifter; and FIG. 8 is a perspective view of a fourth embodiment of the present invention illustrating a preformed spring biasing the fingers inwardly.

DETAILED DESCRIPTION OF THE PREFERRED EMBODIMENTS

Referring now to FIGS. 1–4, the improved apparatus 10 for clamping and driving a flexible disc 11 in accordance with the present invention is shown in perspective and cross section views. The disc 11 is enclosed in a plastic envelope, or jacket 12, so as to form what is commonly referred to as a disc cartridge. The apparatus is of the type that may be included in the flexible disc drive described in U.S. Pat. No. 3,890,643, in the name of Warren L. Dalziel entitled "Flexible Disc Cartridge Ejector System." Accordingly, that application is incorporated by reference to this specification for details of the flexible disc drive apparatus not disclosed herein.

The apparatus is illustrated in cross-sectional view on the spindle 14 of a flexible disc drive cartridge in a clamping position in FIG. 2. As shown, the spindle 14 is mounted on shaft 15 for rotation therewith about an axis. The spindle 14 includes a generally cylindrical base portion 16 and a disc receiving portion 18, that is in the shape of a generally truncated cone, that are integrally formed. The side surfaces of the cone define a camming surface, generally designated by the numeral 20. The face of the base portion 16 defines a clamping surface 22, and a surface of the cone normal to the clamping surface 22 which interconnects the clamping surface and the camming surface 20 is cylindrical in shape and defines a circular registration surface 24. The interior of the spindle 14 is recessed to provide clearance for the stud of the hub assembly. Preferably, the spindle 14 is comprised of stainless steel material with the surfaces 20, 22 and 24 being precisely machined.

A hub assembly, generally designated by the numeral 32, includes a hub 34, a lifter 36, a ball bearing assembly 38 and a spring 40.

The hub 34 is shown in a perspective view in FIG. 3 and in a cross section view in FIG. 4. As shown the hub 34 comprises a central portion 42, eight fingers 44 and hinges 46 hingedly joining each of the fingers 44 to the outer periphery 48 of the portion 42. The hub is comprised of a material that is ductile and flexible and that has good fatigue strength. In the preferred embodiment the hub is molded from an integral block of nylon material. Alternatively, polypropylene or thermoplastic polyesthers may be used.

The central portion 42 has a generally annular shape with a circular inner wall 50 having a greater axial dimension than the outer periphery 48. Eight members 52 extend radially outwardly from the inner wall 50 to the outer periphery and serve as stiffeners to form the hub 34 into a rigid body. The members 52 are identical, separated by about 45° and in substantial alignment with the center of each of the fingers 44. Each member 52 includes an outer surface 54 that is generally flat and that forms an angle of about 10° with the top surface of the central portion 42. The surfaces 54 serve to stop the fingers 44 in a predetermined position as will be subsequently described.

The hinges 46 (commonly referred to as "living hinges") connect the fingers 44 to the hub and extend circumferentially for a dimension corresponding to about 45° of arc length of the outer periphery 48. The hinges 46 enable the fingers 44 to be hingedly movable radially inwardly into a mating engagement with the distal surfaces 54 of the central portion. The thickness and the circumferential and the radial dimensions of the hinges are designed to withstand the axial clamping force without excessive deformation and to maintain bending stress and spring rate at an allowable level.

The fingers 44 are identical in shape and include a tapered end portion 60 adjacent the hinge 46 which blends into an upper surface 62. The upper surface 62 of the finger is cylindrically concave or arcuate in an end view (see FIG. 3) and defines a registration engaging surface 64 opposite the end 60 for mating with the cylindrical surface 24 of the spindle when the hub is in the disc clamping position. A portion 66 of the surface 62 is cored out during molding and serves to ensure that the walls of the finger are uniform in thickness. Protruding upwardly from the central portion of the upper surface 62 is a stop 68 having a trapezoidal shape and an upper surface 70 that is in alignment and mates with the surface 54 when the fingers are urged radially inwardly against the members 52. The outermost surface 74 is joined to the upper surface 62 with a common arcuate edge 76 and resembles a portion of an annular ring in end view (see FIG. 3). The edge 76 serves to first contact the camming surface 20 and thereafter wipe the inner periphery of the flexible disc along the camming surface when the hub engages the spindle. The surface 74 also serves to wipe the disc along the camming surface and to clamp the disc to the clamping surface 22 of the spindle 14. A tapered surface 78 meets the surface 74 and forms a flared portion 80 opposite the surface 62. Spaced from the portion 80 is a raised portion 82 which provides a spring-retaining passageway 86 therebetween. The portions 80 and 82 serve to retain the spring 40 within the passageway.

The spring 40 is a circular coil spring (commonly referred to as a "garter" spring) that serves to continuously urge the fingers 44 radially inwardly to a position where the surfaces 70 of the stops 68 mates with the surfaces 54 of the members 52. Accordingly, the arcuate edges 76 and surfaces 74 are formed into a ring of a predetermined diameter. This position is illustrated by the dashed lines 90 in FIG. 4.

The lifter 36 which is cup-shaped and circular in plan view includes an outer annular portion 94 which has a diameter slightly greater than the outer diameter of the hub 34 (see FIG. 2). A stud 96 formed by four arcuate portions 98 extends upwardly through the center of the lifter 36. The distal ends of the portions 98 are flared to secure the ball-bearing assembly 38 to the lifter. The rear face of the lifter 36 is recessed (not shown) to receive one end of a compression spring (not shown). In a manner which is well known in the art, the other end of the spring is coupled to the cover of the flexible disc drive. The lifter 36 serves to carry the assembled hub 34 and to urge it axially toward the spindle under the force exerted by the compression spring when the cover is closed as indicated by the arrow 99 in FIG. 2. In the preferred embodiment, the lifter is formed from a glass reinforced polycarbonate, although in alternative embodiments any plastic having low creep properties can be used.

The ball bearing assembly 38 is press fit into the opening between the center portion 42 and the stud 96 and retained in such position by the flared distal ends of the portions 98. The assembly 38 allows the hub 34 to be freely rotatable relative to the lifter 36 when it is engaged with and driven by the spindle 14. Alternatively, a retaining ring or a keeper snap ring can be used to couple the bearing assembly to the hub.

In assembling the hub assembly 32, the ball bearing assembly 38 is pressed into the central opening in the portion 42, and the fingers 44 are bend radially inwardly about the hinges 46 so that the surfaces 70 of the stops 68 mate with the surfaces 54 of the stiffeners 52. Next, the spring 40 is extended and pressed into the passageways 86 between the portions 80 and 82. The spring 40 maintains the fingers 44 in such radial inward position with the annular surfaces 74 comprising closely-spaced segments of a ring as shown in FIG. 1. The bearing assembly 38 is then forced over the stud 96, thereby mounting the hub 34 to the lifter 36. The bearing assembly 38 enables the hub 34 to be freely rotatable relative to the lifter 36.

Operation of the present invention will be disclosed by way of example using FIG. 2. When the door of the flexible disc drive is opened, the disc 11 is positioned between the hub 34 and the spindle 14 as shown in FIG. 2. As the door of the disc drive is closed, the compressing spring (not shown) forces the lifter 36 along the axis of the shaft 15 towards the spindle 14. Since the lifter 36 carries the hub 34, it too is moved axially toward the spindle corresponding to the movement of the lifter until the arcuate edges 76 of the clamping surfaces 74 of the fingers 44 engage the camming surface 20 of the spindle. This position is illustrated by the dashed lines in FIG. 2. Continued axial movement forces the fingers 44 to flex outwardly corresponding to the increasing diameter of the camming surface. This causes the ring formed by the clamping surfaces 74 to likewise expand. Since the spindle is normally driven at a constant angular velocity and since the hub assembly is free to rotate, the frictional force between the fingers and the spindle is sufficient to impart rotation to the hub clamp. Simultaneously, as the clamping surfaces 74 contact the inner periphery of the disc 11 they wipe or urge the disc along the camming surface 20 and the registration surface 24 and onto the disc clamping surface 22. This centers the disc on the spindle 14. With the disc so centered on the spindle its inner periphery is in contact with the registration surface 24 of the spindle and its inner face is tightly secured between the clamping surfaces 22 and 74 of the spindle and the fingers, respectively. It should be further noted that in this position the compression force of the spring 40 also serves to positively register the registration engaging surface 64 of the fingers with the registration surface 24.

With the disc clamped in this manner, the spring force acting on the relatively large areas of the fingers in contact with the spindles causes substantially all the driving torque associated with the rotating spindle to be coupled to the hub. Consequently, the spindle and the hub are caused to rotate with the same angular velocity. The cartridge will remain in the loaded record/playback position until the door is opened, which causes the lifter and hence the hub to be moved away from the spindle.

Referring now to FIGS. 5-6, a second embodiment of the present invention is illustrated. The fundamental difference between the embodiment of FIGS. 5-6 and the embodiment of FIGS. 1-4 is that the hub is not a unitary body but comprises a central portion 142 and eight separate fingers 144 which are hingedly joined to the central portion with a simple snap lock configuration. In this embodiment, many of the parts are identical with those illustrated in FIGS. 1-4. Accordingly, identical parts have been designated by the numerals in the 100 series which correspond to those given them in the previous description.

Turning now to FIGS. 5 and 6, the hub 134 is illustrated in plan and cross section views. As shown, the hub 134 comprises the central portion 142 which has a generally annular shape and includes a circular inner wall 150 and eight stiffeners 152 which are tapered to blend into the top surface of the central portion at the outer circumference 148. In this embodiment, the outer circumference serves as a stop. Protruding outwardly from the outer circumference 148 of the central portion in alignment with each of the stiffeners 152 is a flange 153. Extending laterally from each side surface of each flange is a post 155. A finger 144 includes an end 157 having a pair of opposed grooves 159 therein. The grooves 159 serve to receive the pairs of posts 155 in such a manner that the fingers 144 are hingedly joined to each of the pairs of posts 155. After the fingers are snapped into the grooves, the curved arcuate shape of the posts and the conforming shape of the grooves enables the fingers to be hinged relative to the center portion 142. As previously described, the fingers 144 have an upper surface 162 which is arcuate in end view and forms a spindle registration surface 164 which mates with the cylindrical surface 24 of the spindle when the hub is in the disc clamping position. An annular outermost surface 174 meets the surface 162 at a common arcuate boundary 176. The boundary 176 serves to first contact the camming surface 20 and thereafter wipe the inner periphery of the disc along the camming surface during the disc centering and clamping operation. As in the previous embodiment raised portions 180 and 182 form a generally curved passageway 186 therebetween for retaining a compression spring 140.

In order to assemble the hub, the fingers 144 are snapped onto the posts 155 and then moved about the posts radially inwardly to a position where the portion of the upper surface 162 proximate the grooves 159 is stopped by the outer periphery 148. The spring 140 maintains the fingers 144 in such position with the annular surfaces 174 resembling closely spaced segments of a ring. The operation of this embodiment is similar to that previously described.

Still another embodiment of the present invention is illustrated in FIG. 7. In this embodiment, a stud 200 having a head 202 and flared foot portion 204 carried by a ball bearing assembly 206 at the center of a hub 208 (partially shown) is inserted through a central opening 210 of a lifter 212. Accordingly, the stud 200 rotatably mounts the lifter 212 to the hub 208. The flared foot portion 204 serves to maintain the lifter on the stud 202.

Turning now to FIG. 8, an embodiment is illustrated wherein a preformed leaf spring 220 comprising a base 222 and eight arms 224 is used to urge the fingers 226 of a hub 228 radially inwardly. The operation of this embodiment is similar to those previously described.

The terms "top" and "bottom" and words of similar import as used herein are intended to apply only to the position of the parts as illustrated in the drawing, since it is well known that hubs of the general type illustrated may be oriented in many positions.

From the above, it will be seen that there has been provided an apparatus for clamping and driving a flexible disc which fulfills all of the objects and advantages set forth above.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. An apparatus for clamping a flexible disc against a rotatable spindle having a generally frustoconical portion forming a camming surface, an annular portion forming a first disc clamping surface and a cylindrical portion forming a disc registration surface which connects the camming surface and the first clamping surface, comprising:
    a clamping member including,
        a generally annular hub portion having means forming a plurality of stops, and
        a plurality of fingers portions hingedly connected to the outer periphery of said hub portion, each said finger portion terminating in a second clamping surface and having a registration surface engaging surface disposed substantially normal thereto;
    resilient means for biasing said fingers toward the axis of said hub portion and into position against said stops such that said second disc clamping surfaces are disposed along a circular path concentric with said axis; and
    means for rotatably carrying said clamping member into and out of engagement with the spindle such that when said clamping member is in a disengaged position and a disc is inserted between said clamping member and said spindle, movement of said clamping member toward the engaged position causes said second clamping surfaces to engage said disc and to cam over said conical portion until said engaging surface mates with the registration surface and the disc is clamped between said first and second clamping surfaces.

2. An apparatus for clamping a flexible disc as recited in claim 1 wherein said hub portion is integral with said fingers.

3. An apparatus for clamping a flexible disc as recited in claim 1 and further comprising a ball bearing assembly mounted to the inner periphery of said hub portion and coupled to said means for carrying said clamping member.

4. An apparatus for clamping a flexible disc as recited in claim 1 wherein said means for carrying said clamping member is a cup-shaped lifter.

5. An apparatus for clamping a flexible disc as recited in claim 1 wherein said resilient means is a coil spring having an annular shape in plan view.

6. An apparatus for clamping a flexible disc as recited in claim 1 wherein said resilient means is a leaf spring having a plurality of arms, said spring being mounted to the underside of said hub portion with each of said arms disposed against a corresponding one of said plurality of finger portions, said arms serving to urge said finger portions radially inwardly against said stops.

7. An apparatus for clamping a flexible disc as recited in claim 1 wherein said stops include a plurality of elongated members each having a distal end that terminates proximate said outer periphery and serves to limit inward movement of said finger portions, said elongated members also serving to stiffen said hub portion.

8. An apparatus for clamping a flexible disc as recited in claim 7 wherein each said finger portion includes a raised portion that serves to mate with said distal end.

9. An apparatus for clamping a flexible disc as recited in claim 1 wherein the surface forming said outer periphery also forms said stops.

10. An apparatus for clamping a flexible disc as recited in claim 1 wherein said hub portion includes a plurality of flanges forming said outer periphery, each said flange including a pair of opposed posts extending generally tangentially to said outer periphery and wherein said finger portion includes a pair of opposed grooves for receiving said pair of opposed posts, whereby when said grooves receive said posts, said finger portions are hingedly joined to said hub portion.

11. An apparatus for clamping a flexible disc as recited in claim 1 wherein said plurality of finger portions are equally spaced apart and are eight in number.

12. An apparatus for clamping and driving a flexible disc for use with a spindle having a generally conical portion forming a camming surface and having a generally cylindrical portion forming a first disc clamping surface and a disc registration surface, and being rotatable about an axis, said apparatus comprising:
- a generally annular hub having a plurality of raised portions each forming a stop, said hub being rotatable about and movable along said axis;
- a plurality of fingers hingedly connected to the outer periphery of said hub, each of said fingers including a second disc clamping surface and a registration engaging surface;
- a spring disposed circumferentially around said plurality of fingers for biasing said fingers radially inwardly against said stops such that said second disc clamping surfaces form a ring that contacts said camming surface when said hub is moved along said axis and into engagement with said spindle; and
- a generally cup-shaped lifter for carrying said hub, said plurality of fingers and said spring and for moving said hub along said axis, whereby when said disc is loaded between said spindle and said hub and said lifter moves said hub along said axis such that said ring contacts said spindle, continued axial movement of said hub causes said ring to expand corresponding to the increasing diameter of said camming surface and wipe the inner periphery of said disc along said camming surface and said registration surface and onto said first disc clamping surface and whereby said spring causes said second disc clamping surface to clamp said disc to said first disc clamping surface, and also serves to positively register said registration engaging surface with said disc registration surface such that substantially all the driving torque associated with said spindle is coupled to said hub.

* * * * *